UNITED STATES PATENT OFFICE 2,308,325

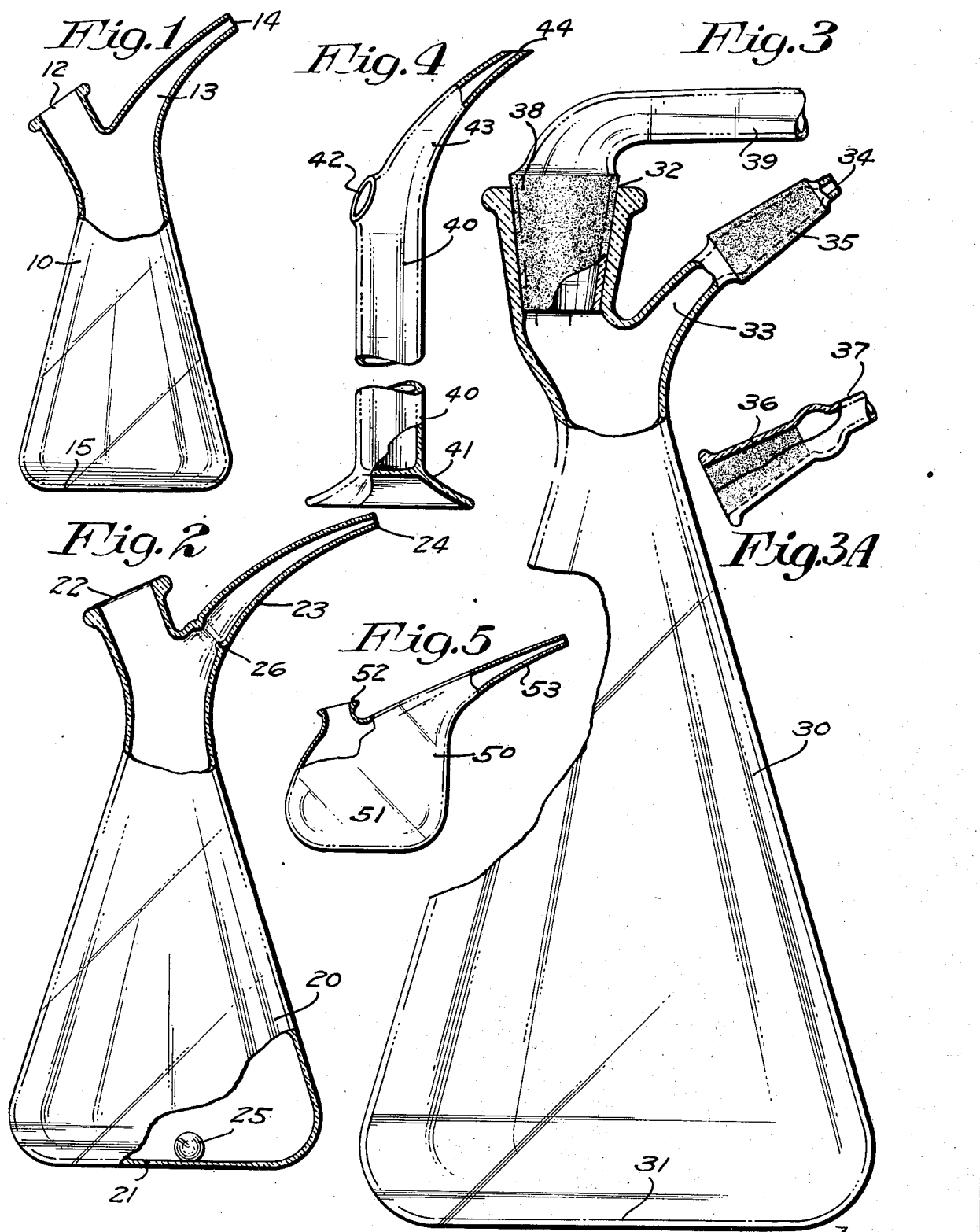

TRANSFER FLASK

Donald S. Binnington, St. Paul, Minn., assignor to General Mills, Inc., a corporation of Delaware Application January 2, 1941, Serial No. 372,756

1 Claim. (Cl. 23—292)

In precise quantitative chemical analyses, it is essential in handling liquids that they be transferred from one vessel to another with as little loss as possible.

It often happens, however, where solutions and liquids particularly those of low viscosity and surface tension, are poured from flasks now in common use, some of the liquid will run down the outside of the flask and loss occurs even when the utmost care is exercised.

It is an object of this invention to provide a flask into which such liquids or solutions may readily be poured and from which they may also be poured with substantially no such loss.

Another object is to provide a flask of this type which can be used as a part of a more complicated system of apparatus.

These and other objects as will hereinafter appear are accomplished by this invention which is fully described in the following specification and shown in the accompanying drawing in which Figure 1 is a side elevation of the small flask embodying the invention;

Fig. 2 is a similar view of a modification of the same;

Fig. 3 is a similar view showing a modification of the apparatus which is adapted for use with other chemical apparatus to which it can be tightly sealed;

Fig. 3A is a similar view showing a tapered hollow sleeve adapted to fit over the tapered spout; and Figs. 4 and 5 are similar views of still other modifications of the invention.

In Fig. 1 is shown a simple embodiment of the idea in a small transfer flask 10 having upwardly and inwardly tapering walls and having a base 15 and a filling opening 12. Adjacent the filling opening is a curved pouring spout 13 which is preferably a curved continuation of the side walls and which has a reduced opening 14 which is preferably substantially at right angles to the axis of the spout.

In using this flask, the liquid to be measured or otherwise handled is poured in through the opening 12. To empty the flask, the liquid is poured out through the opening 14 which, because of its small size, prevents the liquid from running back along the sides of the spout and of the flask.

In Fig. 2 is shown a modification of the invention wherein is a flask 20 having a bottom 21, a filling opening 22 and a pouring spout 23 terminating in a very reduced opening 24. This opening may be thus made so as to produce drops of a given size for a given liquid.

A glass bead or the like 25 is often used in flasks to initiate ebullition and the pouring spout of this flask is provided with one or more indentations 26 to stop this bead and to prevent it from rolling into the narrowing pouring spout and blocking it.

If desired, the opening 22 may be closed by means of a suitable cork, and the spout 23 may be connected to another piece of apparatus as by means of a rubber hose (not shown).

In Fig. 3 is shown another modification of the invention intended particularly for larger sizes and for use in connection with other chemical apparatus. This flask 30 which, like the flasks of Figs. 1 and 2, is preferably of a generally conical shape and provided with a base 31, a filling opening 32 and a pouring spout 33 terminating in a reduced opening 34. In this form the spout 33 is provided with a tapering ground glass enlargement 35 which, however, terminates well back of the end 34 so as not to interfere with the pouring qualities of this spout. The tapered portion 35 is adapted to fit a similarly tapered hollow ground glass sleeve 36 on the end of the tube 37.

The filling opening 32 is preferably internally tapered and ground on a vertical axis to receive a tapered glass end 38 of a tube 39 which leads to any other part of the apparatus as desired. For certain purposes, the tube 37 may be severed and closed so that the member 36 provides a tight cap for the opening 34.

In Fig. 4 is shown still another modification of the invention in which the flask assumes the form of a straight vertical tube 40 with a base 41, a filling opening 42 and a curved pouring spout 43 terminating in an opening 44. In this form the top of this spout may be ground off horizontally to provide a spout which will accurately pour a liquid, drop by drop, with substantially no tendency for the liquid to run back along the outer walls of the pouring spout.

Fig. 5 shows still another form of the flask having a body 50, a base 51, a filling opening 52 and a curved pouring spout 53.

In all these forms it will be noted that with the flask resting on its bottom the pouring spout extends upwardly at such an angle that there is no reverse curve in any element of the flask and therefore the flask empties readily and there is no tendency for liquid in the flask to run up the opposite wall of the flask and out through the filling opening while the flask is being emptied.

As far as may be feasible, I have located the filling opening so that a straight rod may be used with a swab on its end to clean all the inner walls of the flask. In some cases it may be necessary to curve a rod somewhat to reach all surfaces.

Thus it will be seen that I have provided a very simple and efficient form of transfer flask and one which may readily assume numerous forms other than those illustrated. In practice, it has been found to give much more accurate results than other forms of transfer flasks available to the chemist, particularly where he is dealing with certain liquids having relatively low viscosity and low surface tension.

While I have shown but a few embodiments of my invention, it is to be understood that it is capable of many modifications. Changes, therefore, in the construction and arrangement may be made without departing from the spirit and scope of the invention as disclosed in the appended claim.

I claim as my invention:

A transfer flask comprising a body having a base and upwardly and inwardly tapering sides terminating in a gradually and continuously reducing curving pouring spout, a vertical plane through the center of the spout and vertical axis of the flask intersecting the side and spout walls to form a non-reversing curvilinear elemental line extending substantially to the bottom of the flask, and a relatively large filling opening at one side of the pouring spout, the flask being closed except for the filling opening and the open end of the spout.

DONALD S. BINNINGTON.